March 12, 1968 W. R. TOMPKINS ETAL 3,373,298
SWITCHING CIRCUIT
Filed May 4, 1965
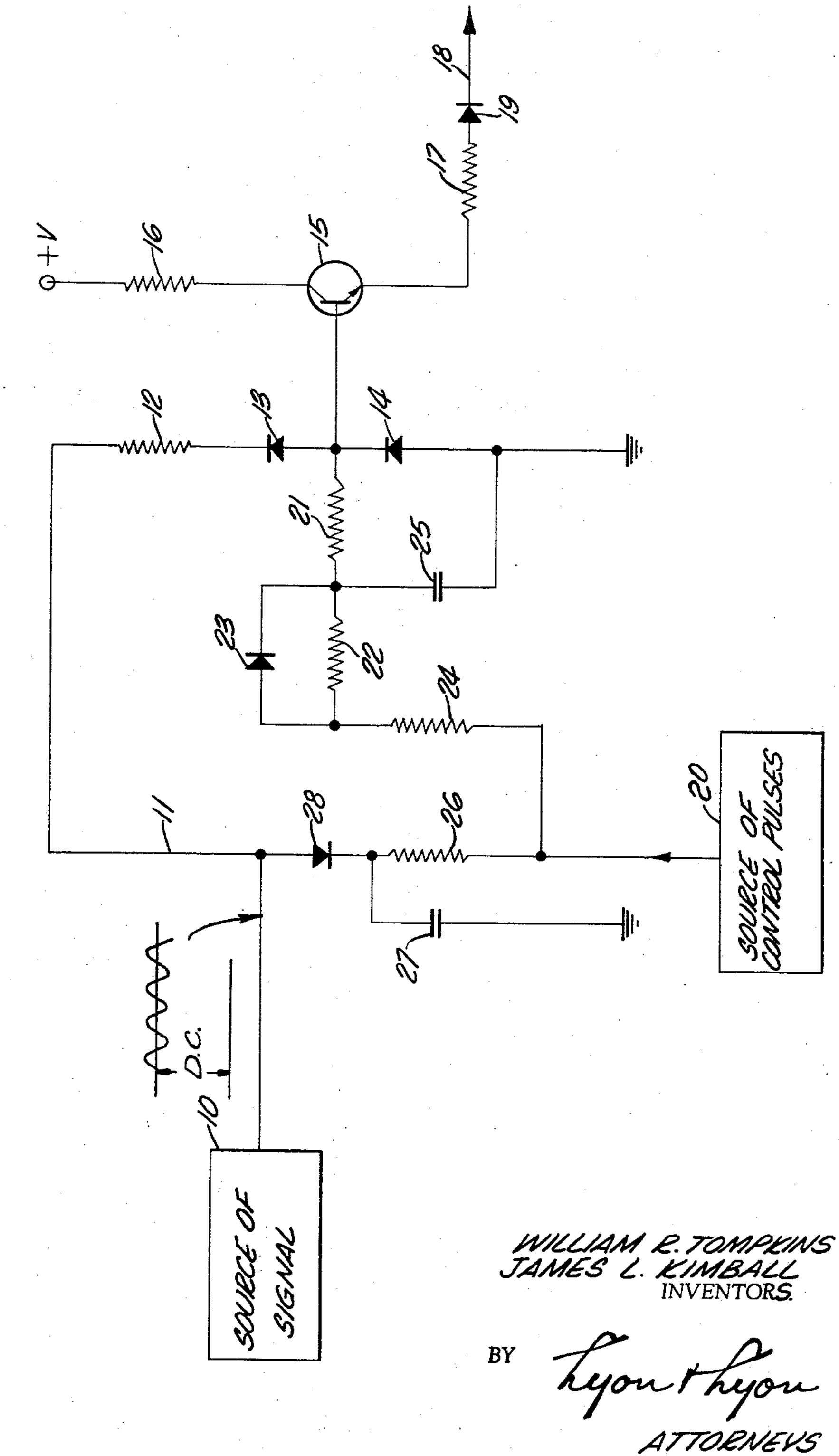
WILLIAM R. TOMPKINS
JAMES L. KIMBALL
INVENTORS.
BY Lyon & Lyon
ATTORNEYS United States Patent Office 3,373,298
Patented Mar. 12, 1968

3,373,298
SWITCHING CIRCUIT

William R. Tompkins, San Diego, and James L. Kimball, La Mesa, Calif., assignors to Cohu Electronics, Inc., San Diego, Calif., a corporation of Delaware Filed May 4, 1965, Ser. No. 453,110
15 Claims. (Cl. 307—256)

ABSTRACT OF THE DISCLOSURE

A switching circuit in which a pair of diodes are rendered alternatively reversed biased and forward baised respectively by the presence of a positive or negative control signal. When forward biased, the first diode allows signals to be passed to the base of an emitter follower transistor while the second diode is back biased. When the first diode is reversed biased, the second diode is forward biased so that signals are shunted to ground and the base of the emitter follower is also grounded so that it is rendered non-conductive. A compensating circuit for maintaining a constant load for the source of signals is provided as is a network for varying the response time of the switch with respect to positive and negative control signals.

This invention relates to a switching circuit and more particularly relates to a circuit which is responsive to an external control pulse for passing or blocking a signal train.

There are many circuit applications where it is desirable to have a switching circuit which is responsive to an external control signal which is always present either as a positive or negative pulse. Such a control signal, for example, may be the output of a conventional flip-flop circuit. It is also often desirable that the switching circuit have the same loading effect on the input signal source whether it is in its signal passing or signal blocking state. It is further desirable that the circuit respond more rapidly to one of the control pulses than to the other. A particular application in which all of these features are desirable is the system disclosed in application Ser. No. 453,116 filed May 14, 1964 by Harold R. Ahrens and the present inventors entitled "Video Switching Circuit," and assigned to the assignee of the present invention, the disclosure of which is incorporated by reference herein.

It is an object of the present invention to provide a switching circuit satisfying one or more of the above enumerated criteria.

Further objects and advantages of the present invention will become apparent upon reference to the accompanying description and the drawing, the single figure of which is an electrical schematic diagram of the circuit of the present invention.

In the drawing, a source of signals 10 has its output connected through a line 11 to one end of a resistor 12, the other end of which is connected to the cathode of a diode 13. The anode of the diode 13 is coupled to the cathode of a second diode 14, the anode of which is connected to ground. The junction of the diodes 13 and 14 is connected to the base of an NPN transistor 15, the collector of which is connected to a source of positive potential through a resistor 16 and the emitter of which is connected through a resistor 17 to an output line 18 in which is connected a diode 19. The junction of the diodes 13 and 14 is also connected to a source of external control signals 20 through a resistor 21, the parallel combination of a resistor 22 and a diode 23 and a resistor 24. The junction of the resistor 21 and the parallel combination of resistor 22 and diode 23 and a resistor 24. The junction of resistor 21 and the parallel combination of resistor 22 and diode 23 is connected to ground through a capacitor 25. A typical source of external control signals is a flip-flop which produces an output pulse of either +10 volts or −10 volts. In any event, the control signal should be of greater magnitude than the maximum magnitude of the input signal.

The external control signal source 20 is also connected through a resistor 26 and a capacitor 27 to ground. The junction of the resistor 26 and the capacitor 27 is connected to the cathode of a diode 28, the anode of which is connected to the line 11.

The operation of the switching circuit just described is as follows. Assume that the output of the source 10 has a DC output voltage level of +5.1 volts with a 1 volt peak to peak signal superimposed thereon. To block this signal train, a control signal of −10 volts is produced by the external controller. This negative pulse reverse biases diode 13 blocking the negative signals produced by the source 10 and forward biases diode 14, shunting the base of transistor 15 to ground. This causes the transistor 15 to be rendered nonconducting. When this switching circuit is used in conjunction with other similar switching circuits, for example, in the system described in the aforementioned application, the diode 19 becomes back biased and also serves to block the signal train. This diode also serves to reduce the capacitive loading on the line 18. Thus, signals from the source 10 are prevented from reaching the output line 18 in four manners: the diode 13 blocks the signal, any signal that does pass the diode 13 is shunted to ground, the transistor 15 is not conducting and thus does not pass or amplify any signals that may happen to be applied to its base, and the diode 19 is back biased and will not conduct.

When the signal train is to be passed, the source of control signals 20 is caused to produce an output pulse of +10 volts. This positive pulse reverse biases diode 14 and forward biases diode 13. The resulting positive voltage at the base of transistor 15 turns it on and the video signals are passed through it to the line 18.

The characteristics of the transistor 15 and the input impedance to its base produce an inductive output reactance. Since in a normal case the output line 18 is an unterminated short transmission line, its principal impedance component is capacitive reactance. Proper selection of the value of the resistor 17 connecting the emitter follower transistor 15 to the line 18 results in the damping of the frequency response characteristics of the resultant LC circuit. The resistance of this resistor must take into account the emitter resistance of the transistor 15.

The network 26, 27 and 28 is provided to assure that a constant load is presented to the source of signal 10 whether or not the switch is in its signal passing state. When the control signal is positive and the switch is on or closed, the diode 28 is back biased and the compensating network is effectively disconnected from the line 10. When the control signal is negative, however, the diode 28 is forward biased and the compensating network loads the signal source 10 to the same degree that the switch itself would were it switched on.

In systems where a plurality of switches similar to the one described are used to control different circuits or signal translating paths, it is often necessary that the control signal which turns off a given switch occur before the control signal which turns on another switch. An example of such a requirement is found in the system disclosed in the aforementioned application. Since it is often required that the switches themselves operate simultaneously, it is necessary to in some way delay the effect of the turn off control pulse relative to the turn on control pulse. This is accomplished according to the present invention by means of the networks 22, 23, 24 and 25.

As can be seen, the diode 23 shunts the resistor 22 when a positive control signal is produced by the control signal source 20, and thus the network has a relatively fast rise time, because the time constant of the network is determined only by resistor 24 and capacitor 25. On the other hand, if a negative control signal appears, the diode 23 is out of the circuit so that the time constant of the network depends on the values of both resistors 24 and 22 and the capacitor 25. By providing the resistor 22 with a substantially greater value than the resistor 24, for example, four times greater, the effect of the negative control signal can be made much slower than that of the positive control signal and two different switches can be made to operate at the same time even though the on pulse to one is generated some time after the off pulse to the other.

From the foregoing description, it can be seen that a switching circuit has been provided that is controllable by an external source of control pulses to effectively block the input signal to it. On the other hand, it can be energized to pass the input signals with very little distortion. The circuit is provided with a compensating network so that the load on the source of the input signals is maintained constant regardless of the state of the switching circuit. Moreover, the circuit is provided with a network that permits it to respond more rapidly to one type of control signal than to the opposite type.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A switching circuit comprising a source of signals having a DC voltage level of a first polarity having an alternating current component superimposed thereon, first and second diodes having a junction therebetween, means connecting said source of signals and said first and second diodes in a series circuit, said diodes being poled to prevent passage of said signals, an emitter follower transistor having its base conductively connected to said junction of said first and second diodes, an output line, means coupling said output line to the emitter of said transistor, a source of control pulses, and resistance means connecting said control pulse source of said junction, said control pulse source selectively producing a first pulse of the same polarity as said DC voltage level but of greater magnitude than the maximum magnitude of said signal and a second pulse of the opposite polarity, the production of said first pulse causing said first diode to be forward biased, said second diode to be reverse biased, and said emitter follower to conduct and pass said signals, and the production of said second pulse causing said first diode to be reverse biased, said second diode to be forward biased and said emitter follower to be rendered non-conductive.

2. The circuit of claim 1 wherein said coupling means includes a resistor selected to dampen the frequency response characteristics of the LC circuit formed by the capacitive reactance of said output line and the output inductive reactance of said transistor.

3. A switching circuit comprising means for supplying signals having a DC voltage level of a first polarity, first and second diodes having a junction therebetween, means connecting said signal supplying means and said first and second diodes in a series circuit, said diodes being poled to prevent passage of said signals, an emitter follower transistor having its base connected to said junction of said first and second diodes, an output line, means coupling said output line to the emitter of said transistor, a source of control pulses, said control pulse source selectively producing a first pulse of the same polarity as said DC voltage level but of greater magnitude than the maximum magnitude of said signal and a second pulse of the opposite polarity, resistive means coupling said control pulse source to said junction, means for shunting a portion of said resistive means when a first pulse is produced by said control pulse source and capacitive means coupling the end of said resistive means remote from said control pulse source with the side of said second diode remote from said first diode, the production of said first pulse causing said first diode to be forward biased, said second diode to be reverse biased, and said emitter follower to conduct and pass said signals, and the production of said second pulse causing and first diode to be reverse biased, said second diode to be forward biased and said emitter follower to be rendered non-conductive.

4. The circuit of claim 4 wherein said coupling means includes a diode.

5. A switching circuit comprising a source of signals having a DC voltage level of a first polarity, first and second diodes having a junction therebetween, means connecting said source of signals and said first and second diodes in a series circuit, said diodes being poled to prevent passage of said signals, an emitter follower transistor having its base connected to said junction of said first and second diodes, an output line, means coupling said output line to the emitter of said transistor, a source of control pulses, said control pulse source selectively producing a first pulse of the same polarity as said DC voltage level but of greater magnitude than the maximum magnitude of said signal and a second pulse of the opposite polarity, means including first, second and third resistors having junctions therebetween connecting said control pulse source to said junction between said first and second diodes, a third diode connected in shunt with said second resistor, said third diode being poled to pass said first pulses, and a capacitor coupling the junction of said second and third resistors with the side of said second diode remote from said first diode, the production of said first pulse causing said first diode to be forward biased, said second diode to be reverse biased, and said emitter follower to conduct and pass said signals, and the production of said second pulse causing said first diode to be reverse biased, said second diode to be forward biased and said emitter follower to be rendered non-conductive.

6. The circuit of claim 3 wherein said coupling means includes a resistor.

7. The circuit of claim 5 wherein said coupling means includes a resistor and a diode.

8. A switching circuit comprising a source of signals having a DC voltage level of a first polarity, first and second diodes having a junction therebetween, means connecting said source of signals and said first and second diodes in a series circuit, said diodes being poled to prevent passage of said signals, an emitter follower transistor having its base connected to said junction of said first and second diodes, an output line, means coupling said output line to the emitter of said transistor, a source of control pulses, said control pulse source selectively producing a first pulse of the same polarity as said DC voltage level but of greater magnitude than the maximum magnitude of said signal and a second pulse of the opposite polarity, means connecting said control pulse source to said junction, a compensating network, means coupling said compensating network to said control pulse source, and means operative in response to a second pulse from said control pulse source to couple said compensating network to said source of signals, the production of said first pulse causing said first diode to be forward biased, said second diode to be reverse biased, and said emitter follower to conduct and pass said signals, and the production of said second pulse causing said first diode to be reverse biased, said second diode to be forward biased and said emitter follower to be rendered non-conductive, said compensating network causing said source of signals to be loaded to the same degree during the production of said second pulse as during the production of said first pulse.

9. A switching circuit comprising means for supplying signals having a DC voltage level of a first polarity, first and second diodes having a junction therebetween, means connecting said signal supplying means and said first and second diodes in a series circuit, said diodes being poled to prevent passage of said signals, an emitter follower transistor having its base connected to said junction of said first and second diodes, an output line, means coupling said output line to the emitter of said transistor, a source of control pulses, said control pulse source selectively producing a first pulse of the same polarity as said DC voltage level but of greater magnitude than the maximum magnitude of said signal and a second pulse of the opposite polarity, means connecting said control pulse source to said junction between said diodes, resistive means, a capacitor, means coupling said resistive means and said capacitor to said control pulse source said resistance means and said capacitor having a junction therebetween, a third diode, and means connecting said third diode between said source of signals and said junction of said resistive means and said capacitor, said third diode being poled to pass said signals, the production of said first pulse causing said first diode to be forward biased, said second diode to be reverse biased, and said emitter follower to conduct and pass said signals, and the production of said second pulse causing said first diode to be reverse biased, said second diode to be forward biased and said emitter follower to be rendered non-conductive.

10. The circuit of claim 9 wherein said coupling means includes a resistor.

11. A switching circuit comprising a source of signals having a D.C. voltage level of a first polarity, first and second diodes having a junction therebetween, first resistance means, means connecting said source of signals, said first resistance means and said first and second diodes in a series circuit, said diodes being poled to prevent passage of said signals, an emitter follower transistor having its base connected to said junction of said first and second diodes, an output line, means coupling said output line to the emitter of said transistor, a source of control pulses, said control pulse source selectively producing a first pulse of the same polarity as said DC voltage level but of greater magnitude than the maximum magnitude of said signal and a second pulse of the opposite polarity, second resistive means coupling said control pulse source to said junction between said diodes, means for shunting a portion of said second resistive means when a first pulse is produced by said control pulse source, capacitive means coupling the end of said second resistive means remote from said control pulse source with the side of said second diode remote from said first diode, a compensating network, means coupling said compensating network to said control pulse source, and means operative in response to a second pulse from said control pulse source to couple said compensating network to said source of signals, the production of said first pulse causing said first diode to be forward biased, said second diode to be reverse biased, and said emitter follower to conduct and pass said signals, and the production of said second pulse causing said first diode to be reverse biased, said second diode to be forward biased and said emitter follower to be rendered non-conductive.

12. A switching circuit comprising a source of signals having a DC voltage level of a first polarity, first and and second diodes having a junction therebetween, first resistance means, means connecting said source of signals, said first resistance means and said first and second diodes in a series circuit, said diodes being poled to prevent passage of said signals, an emitter follower transistor having its base connected to said junction of said first and second diodes, an output line, means coupling said output line to the emitter of said transistor, a source of control pulses, said control pulse source selectively producing a first pulse of the same polarity as said DC voltage level but of greater magnitude than the maximum magnitude of said signal and a second pulse of the opposite polarity, means including first, second and third resistors having junctions therebetween connecting said control pulse source to said junction between said diodes, a third diode connected in shunt with said second resistor, said third diode being poled to pass said first pulses, and a capacitor coupling the junction of said second and third resistors with the side of said second diode remote from said first diode, a fourth resistor, a second capacitor, means coupling said fourth resistor and said second capacitor to said control pulse source, said fourth resistor and said second capacitor having a junction therebetween, a fourth diode, and means connecting said fourth diode between said source of signals and the junction of said fourth resistor and said second capacitor, said fourth diode being poled to pass said signals, the production of said first pulse causing said first diode to be forward biased, said second diode to be reverse biased, and said emitter follower to conduct and pass said signals, and the production of said second pulse causing said first diode to be reverse biased, said second diode to be forward biased and said emitter follower to be rendered non-conductive.

13. The circuit of claim 12 wherein said coupling means includes a resistor.

14. The circuit of claim 12 wherein said coupling means includes a diode.

15. The circuit of claim 12 wherein said coupling means includes a resistor and a diode.

References Cited

UNITED STATES PATENTS

| | | | |
|---|---|---|---|
| 2,946,901 | 7/1960 | Kyler | 307—88.5 |
| 2,951,980 | 9/1960 | Jones et al. | 307—88.5 |
| 2,994,789 | 8/1961 | Gottfried | 307—88.5 |

ARTHUR GAUSS, *Primary Examiner.*

B. P. DAVIS, *Assistant Examiner.*